F. DARLINGTON.
SYSTEM OF ELECTRICAL DISTRIBUTION.
APPLICATION FILED JUNE 25, 1906.
1,013,133.
Patented Jan. 2, 1912.
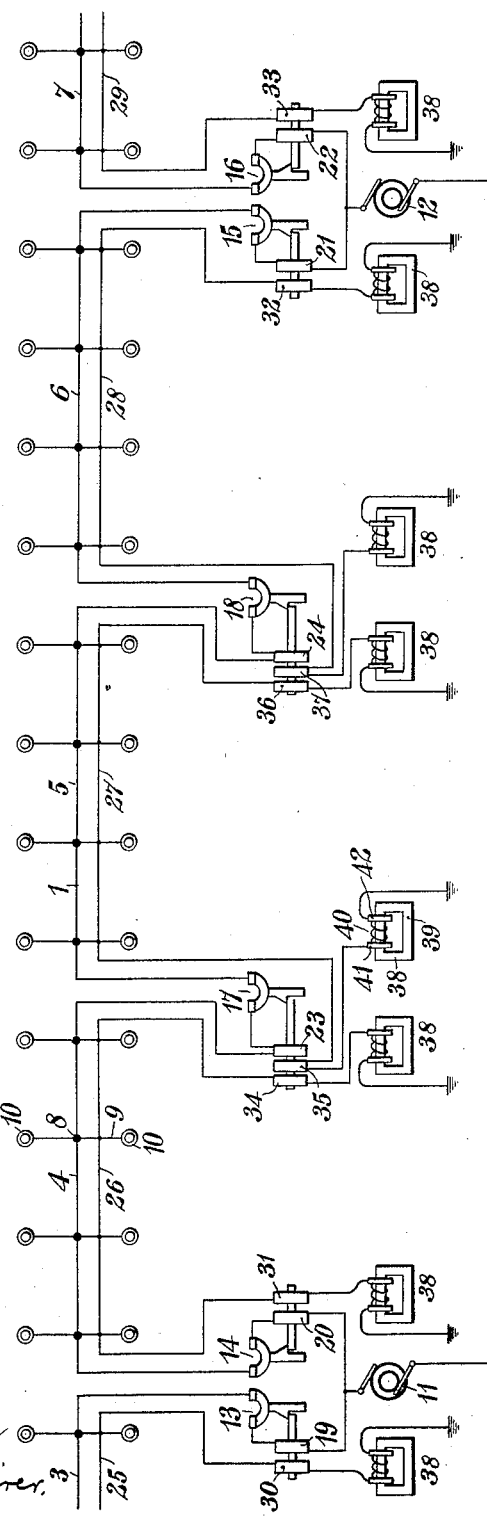
WITNESSES:
C. L. Belcher
Otto S. Schairer
INVENTOR
Frederick Darlington
BY
Wesley G. Carr
ATTORNEY
COLUMBIA PLANOGRAPH CO., WASHINGTON, D. C.

UNITED STATES PATENT OFFICE.

FREDERICK DARLINGTON, OF PITTSBURGH, PENNSYLVANIA, ASSIGNOR TO WESTINGHOUSE ELECTRIC & MANUFACTURING COMPANY, A CORPORATION OF PENNSYLVANIA.

SYSTEM OF ELECTRICAL DISTRIBUTION.

1,013,133.  Specification of Letters Patent.  Patented Jan. 2, 1912.

Application filed June 25, 1906. Serial No. 323,365.

*To all whom it may concern:*

Be it known that I, FREDERICK DARLINGTON, a citizen of the United States, and a resident of Pittsburgh, in the county of Allegheny and State of Pennsylvania, have invented a new and useful Improvement in Systems of Electrical Distribution, of which the following is a specification.

My invention relates to systems of electrical distribution and particularly to systems for supplying power to electric railways.

The object of my invention is to provide means whereby the effects of grounding of the trolley conductor of a railway system and of other injuries thereto may be localized and interruption of the service over the entire system thus prevented, and also whereby such injuries may be prevented from causing other and more serious damage.

The trolley conductors of electric railway systems are frequently suspended by means of insulators from supporting wires or brackets that are secured to wooden poles or other wooden or inflammable parts. In such systems, if the trolley conductor becomes connected to the supporting wires or brackets in any manner, as by the breaking of an insulator, the wooden poles may become ignited and destroyed with consequent danger to adjacent structures.

According to the present invention, the trolley conductor is divided into a plurality of sections that are connected by circuit-breakers, and the supporting wires or brackets for each section are connected by means of auxiliary conductors the terminals of which are grounded, tripping magnet windings for the circuit-breakers being connected in circuit therewith, and also with the trolley conductor, in such a manner that when the trolley conductor becomes electrically connected to its supports or to the ground, the section of the trolley conductor to which the injury has occurred will be isolated by the opening of the circuit-breakers at its terminals.

The single figure of the accompanying drawing is a diagrammatic view of a system that embodies my invention.

A trolley conductor 1 of a railway system, that comprises also a track rail 2, is divided into a plurality of sections 3, 4, 5, 6 and 7, and is here shown as secured by means of insulators 8 to supporting wires 9 that are stretched between wooden poles 10, though it may be supported by other structures, if desired. The trolley conductor is supplied from suitable sources, such as those shown at 11 and 12, the source 11 being connected thereto beyond the sections 3 and 4 by means of circuit-breakers 13 and 14, and the source 12 being connected between the sections 6 and 7 by means of circuit-breakers 15 and 16. Sections 4 and 5 of the trolley conductor are connected by means of a circuit-breaker 17 and the sections 5 and 6 by means of a circuit-breaker 18, and the circuit-breakers 13 to 18 inclusive, are provided, respectively, with tripping magnet windings 19, 20, 21, 22, 23 and 24, that are connected in circuit with the trolley conductor, and become sufficiently energized to permit opening of the corresponding circuit-breakers only when the current in the trolley conductor is abnormally large.

The supporting wires for the respective sections of the trolley conductor are connected to auxiliary conductors 25, 26, 27, 28 and 29, the terminals of which are grounded at the ends of the sections. The circuit-breakers 13 and 14 are provided with tripping magnet windings 30 and 31 that are connected in circuit, respectively, with the auxiliary conductors 25 and 26, and the circuit-breakers 15 and 16 are similarly provided with tripping magnet windings 32 and 33 that are connected, respectively, in circuit with auxiliary conductors 28 and 29. The circuit-breaker 17 is provided with tripping magnet windings 34 and 35 that are connected in circuit, respectively, with conductors 26 and 27, and circuit-breaker 18 is similarly provided with tripping magnet windings 36 and 37 that are connected, respectively, in the circuit with auxiliary conductors 27 and 28.

Interposed in circuit with and near the grounded terminals of the auxiliary conductors 25 to 29, inclusive, are impedance devices 38 that serve to prevent large amounts of current from traversing the auxiliary conductors. However, they are preferably so constructed that if the circuit-breakers fail to open because of unknown defects and any considerable amount of current traverses them, the windings will be destroyed and low resistance grounded connections will be afforded for the auxiliary conductors. Each of the impedance devices is here shown as comprising a magnetizable core 39 and a comparatively fine wire winding 40 therefor that is connected between enlarged terminal pieces 41 and 42, the insulation of the winding 40 being destroyed upon the continuance of more than a predetermined amount of current in the circuits of the auxiliary conductors, and low resistance connections being thus formed between the terminal pieces 41 and 42.

In order to explain the operation of the invention, it may be first assumed that the section 5 of the trolley conductor becomes accidentally connected to one of the supporting wires 9 therefor. Circuits are then established from the trolley conductor through the accidental connection between the conductor and the supporting wire, in opposite directions through the auxiliary conductor 27 and through tripping magnet windings 35 and 36 of the circuit-breakers 17 and 18. The circuit-breakers 17 and 18 are thus caused to open and the section 5 of the trolley conductor becomes disconnected from the remainder of the system. The amounts of current that traverse the auxiliary conductor are limited by means of the impedance devices 38 so that no great amount of current is taken from the system upon the occurrence of an injury thereto. If, however, the circuit-breakers should stick, or if for any other reason they should not operate immediately, the continuation of the current in the windings of the impedance devices will cause them to be destroyed and a low resistance ground connection will be afforded for the auxiliary conductor and a greater amount of current will thus be permitted to traverse it. The greater amount of current traversing the windings 35 and 36 will cause them to exert greater forces upon the tripping mechanisms for the circuit-breakers, and will thus insure their opening before serious damage is done to the system. At the same time, larger amounts of current will traverse the windings 23 and 24, which will also cause greater forces to be exerted upon the tripping mechanisms for the circuit-breakers and assist in effecting their opening.

If the section 4 of the trolley conductor should become connected in any manner to one or more of the supporting wires 9 therefor, circuits will be established from the trolley conductor through the accidental connection to the auxiliary conductor 26, and through the tripping magnet windings 31 and 34 of the circuit-breakers 14 and 17, which will then operate in a manner that will be readily understood from the foregoing description of the operation of the circuit-breakers 17 and 18. If any section of a trolley conductor should become grounded without becoming connected to one of the auxiliary conductors the circuit-breakers at the terminals of the injured section will be permitted or caused to open because of the abnormal amounts of current which will traverse the trolley conductor and the tripping magnet windings that are in circuit therewith.

In order that the system may operate in the manner set forth, the circuit-breaker tripping magnet windings that are connected in circuit with the auxiliary conductors 25 to 29, inclusive, will ordinarily become sufficiently energized to effect opening of the circuit-breakers when comparatively small amounts of current traverse them. Thus, when the trolley conductor becomes connected to the supports 9, the poles may serve as poor insulators, or rather as high resistance conductors, and permit a sufficient amount of current to traverse the auxiliary tripping magnet windings to effect opening of the circuit-breakers before injury to the poles occurs. The auxiliary tripping magnet windings for the circuit-breakers cause the breakers at the terminals of an injured section to open before the other circuit-breakers in the system are caused to open by reason of an excessive amount of current traversing the system and the main tripping magnet windings. Thus, it is seen that upon the occurrence of an injury to the trolley conductor, the injured section thereof will be automatically disconnected from the remainder of the system before other and more serious damage can be done.

I claim as my invention:

1. In a system of distribution, the combination with a conductor comprising a plurality of sections, supports therefor, and insulators for connecting the conductors to the supports, of a circuit-breaker for connecting each pair of adjacent sections of the conductor together, auxiliary conductors electrically connected to the supports for the respective sections of the main conductor, and a plurality of tripping magnet windings for each circuit-breaker, said windings being in circuit, respectively, with the auxiliary conductors of adjacent sections.

2. In a system of distribution, the combination with a conductor comprising a plurality of sections, supports therefor, and insulators for connecting the conductors to the supports, of a circuit-breaker for connecting each pair of adjacent sections of the conductor together, auxiliary conductors electrically connected to the supports for the respective sections of the main conductor, and a plurality of tripping magnet windings for each circuit-breaker, said windings being connected in circuit, respectively, with the main conductor and with the auxiliary conductors of adjacent sections.

3. In a system of distribution, the combination with a conductor comprising a plurality of sections, supports therefor, and insulators for connecting the conductors to the supports, of a circuit-breaker for connecting each pair of adjacent sections of the conductor together, auxiliary conductors electrically connected to the supports for the respective sections of the main conductor, and a plurality of tripping magnet windings for each circuit-breaker, said windings being connected in circuit, respectively, with the main conductor and with the auxiliary conductors.

4. In a system of distribution, the combination with a conductor comprising a plurality of sections, supports therefor, and insulators for connecting the conductors to the supports, of a circuit-breaker for connecting each pair of adjacent sections of the conductor together, auxiliary conductors electrically connected to the supports for the respective sections of the main conductor and the terminals of which are permanently grounded, and a plurality of tripping magnet windings for the circuit-breakers, said windings being connected in circuit, respectively, with the auxiliary conductors of adjacent sections.

5. In a system of distribution, the combination with a conductor comprising a plurality of sections, supports therefor, and insulators for connecting the conductors to the supports, of a circuit-breaker for connecting each pair of adjacent sections of the conductor together, auxiliary conductors electrically connected to the supports for the respective sections of the main conductor and having grounded terminals, circuit-breaker tripping magnet windings connected in circuit, respectively, with the auxiliary conductors of adjacent sections, and impedance devices also connected in circuit with the auxiliary conductors.

6. In a system of distribution, the combination with a conductor comprising a plurality of sections, supports therefor, and insulators for connecting the conductors to the supports, of circuit-breakers for connecting the sections of the conductor together, auxiliary conductors connected to the supports for the respective sections of the main conductor and having grounded terminals, circuit-breaker tripping magnet windings connected in circuit, respectively, with the auxiliary conductors of adjacent sections, impedance devices also connected in circuit with the auxiliary conductors, and means for causing removal of the impedance devices from the circuits upon the continuance of currents therein for more than the predetermined period of time.

7. In a system of distribution, the combination with a conductor comprising a plurality of sections, supports therefor, and insulators for connecting the conductor to the supports, of a source of energy, circuit-breakers for connecting the same to adjacent sections of the conductor, auxiliary conductors electrically connected to the supports for the respective sections of the main conductor, and circuit-breaker tripping magnet windings connected in series, respectively, with the adjacent sections of the main conductor and with the auxiliary conductors of said sections.

In testimony whereof I have hereunto subscribed my name this 15th day of June, 1906.

FREDERICK DARLINGTON.

Witnesses:
  OTTO S. SCHAIRER,
  BIRNEY HINES.

---

Copies of this patent may be obtained for five cents each, by addressing the "Commissioner of Patents, Washington, D. C."